H. P. HOLM.
FOOD SLICING MACHINE.
APPLICATION FILED MAR. 19, 1913.
1,123,534.
Patented Jan. 5, 1915.
4 SHEETS—SHEET 1.
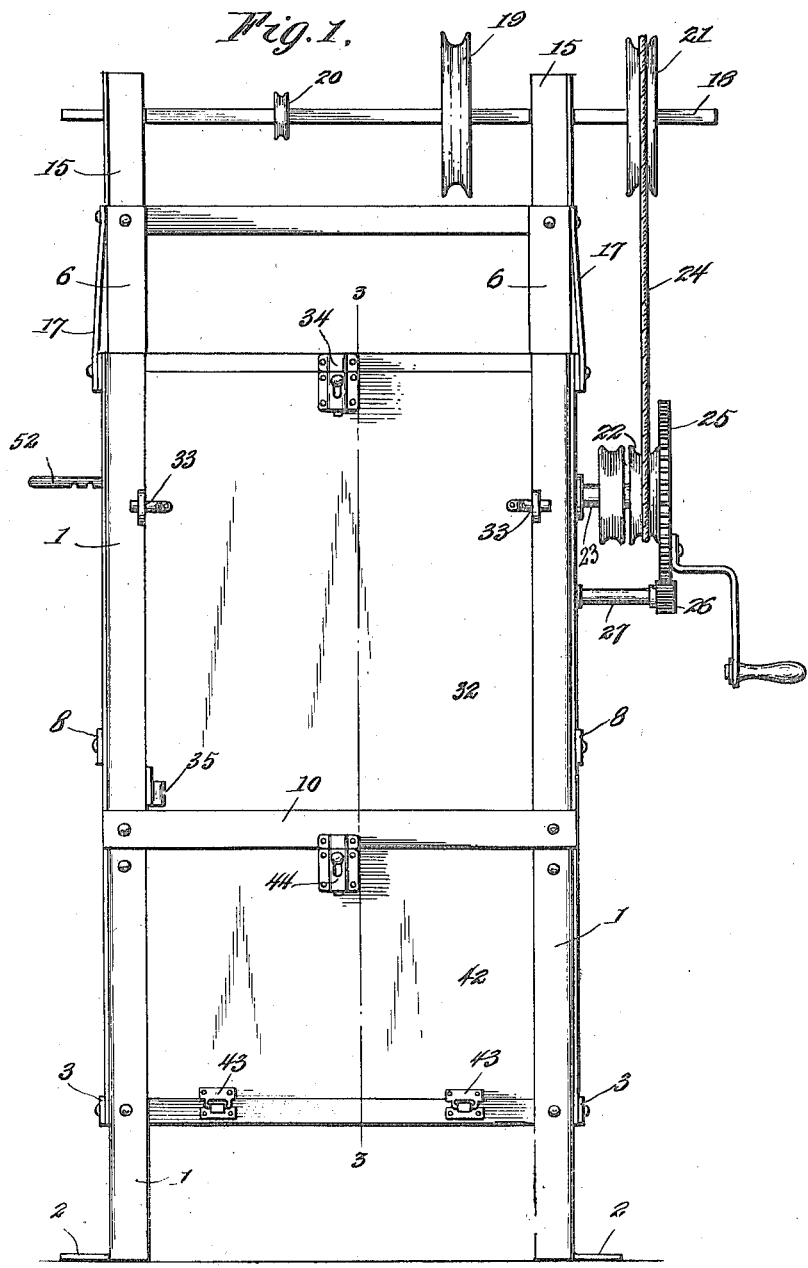
WITNESSES
INVENTOR

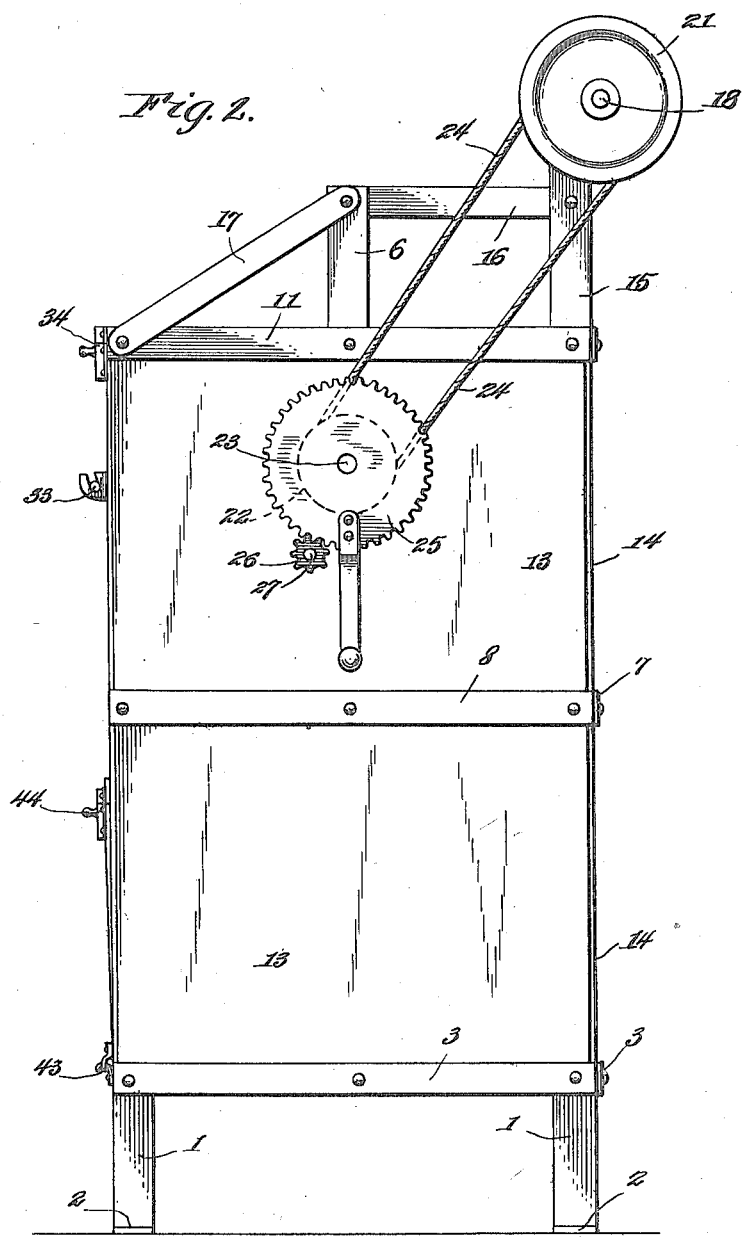

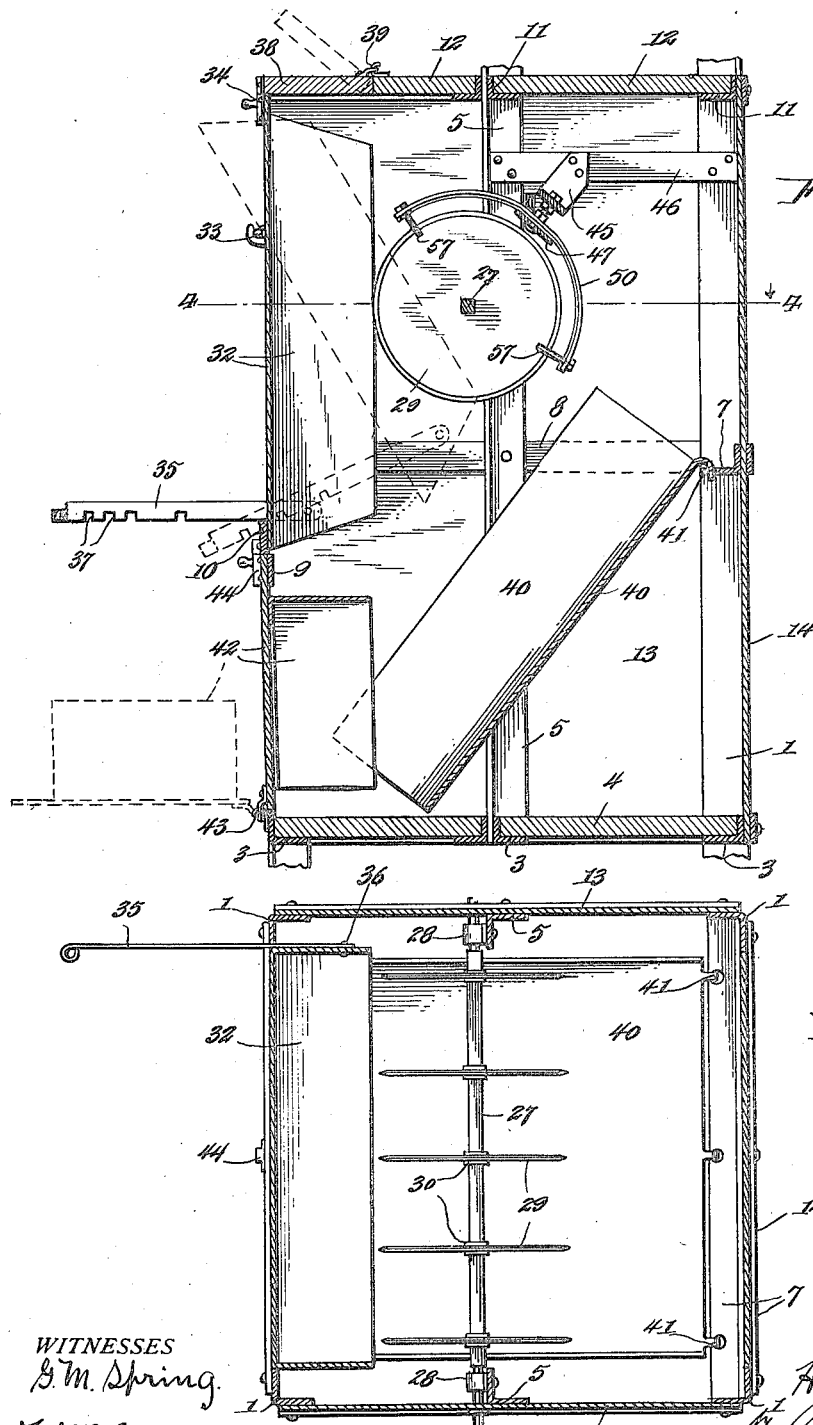

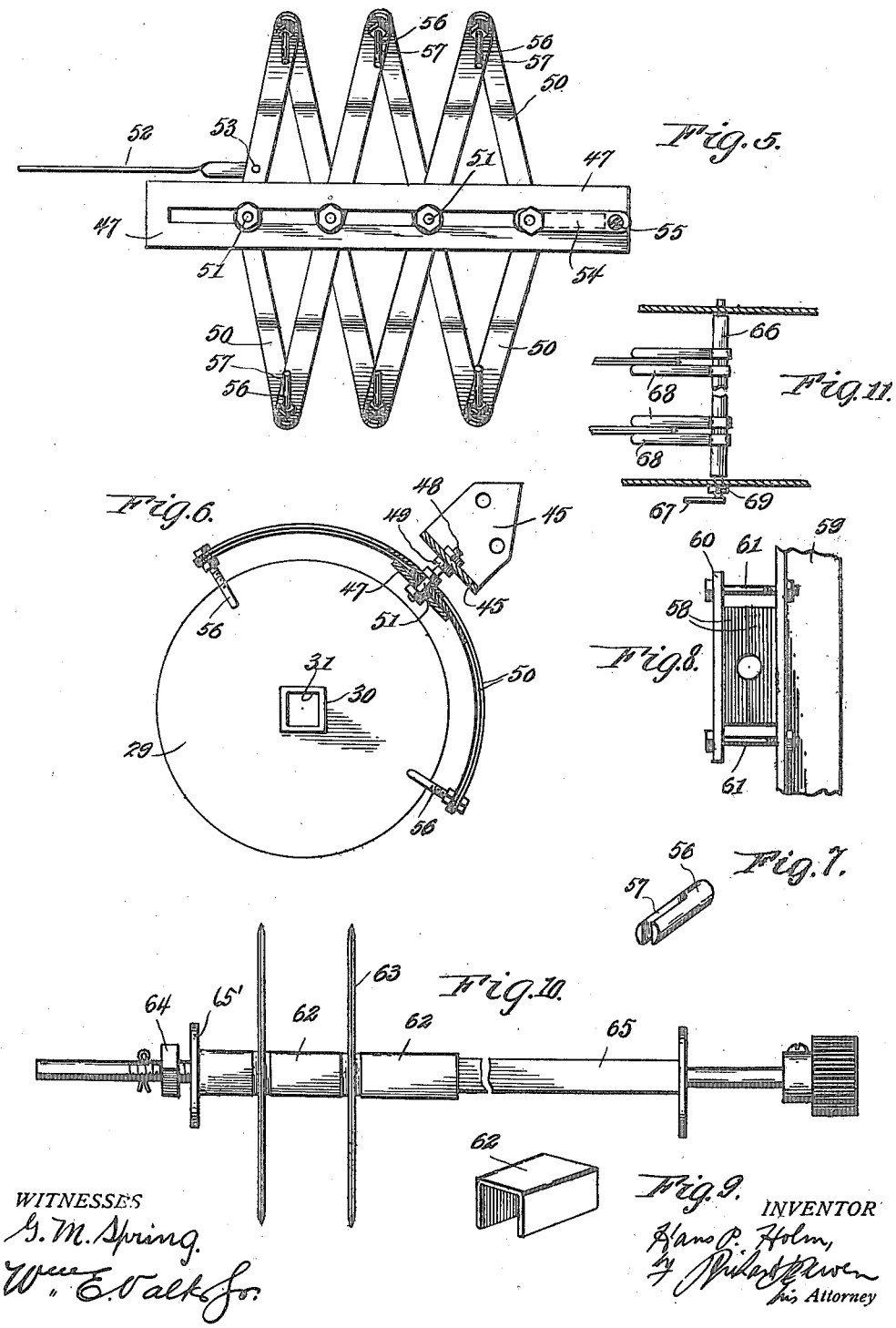

UNITED STATES PATENT OFFICE.

HANS P. HOLM, OF DAVENPORT, IOWA, ASSIGNOR OF ONE-HALF TO HENRY H. VOGT, OF DAVENPORT, IOWA.

FOOD-SLICING MACHINE.

1,123,534. Specification of Letters Patent. Patented Jan. 5, 1915.

Application filed March 19, 1913. Serial No. 755,432.

*To all whom it may concern:*

Be it known that I, HANS P. HOLM, a citizen of the United States, residing at Davenport, in the county of Scott and State of Iowa, have invented certain new and useful Improvements in Food-Slicing Machines, of which the following is a specification.

My present invention relates generally to the class of machines for cutting, slicing or chopping meats or other food materials.

The primary object of my invention is to provide a machine of this character wherein the meat or other food materials to be operated upon is presented to the cutting or slicing mechanism positively and with the desired regularity and rapidity.

A further object of my invention contemplates the provision of simple and efficient means whereby the meat or food operated upon is prevented from adhering to the knives or cutters, such means also serving as guideways for the cutting blades.

A still further object of my invention resides in the provision of suitable means whereby uniform lateral adjustment of the cutting blades is permitted.

A further object of my invention is to provide a machine of this character, capable of slicing any manner of food or food material whatsoever, the food being brought to, through and from the slicing or cutting mechanism by its own weight or by gravity, a feature, as far as known to the inventor no other food slicing machine employs.

A still further object of the invention is to provide means, arranged within the machine, whereby the size, thickness and quantity of food slices may be varied as desired or as occasion demands.

The above and additional objects are accomplished by such means as are illustrated in their preferred embodiment in the accompanying drawings, described in the following specification, and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a front elevation of a machine constructed in accordance with my invention. Fig. 2 is a side elevation. Fig. 3 is a section on line 3—3 of Fig. 1. Fig. 4 is a section on line 4—4 of Fig. 3. Fig. 5 is a detail elevation of the blade adjusting mechanism. Fig. 6 is a detail elevation of the blades, with the adjusting mechanism shown in section. Fig. 7 is a detail view of one of the guide pins. Fig. 8 is a modified form of shaft bearing. Fig. 9 is a detail perspective view of one of the spacing brackets, Fig. 10 illustrates a modified form of blade adjusting mechanism, and Fig. 11 is a modified form of blade cleaning device.

Proceeding now to the description of the drawings wherein is illustrated the preferred form of my invention the numeral 1 designates the four vertically extending angle-irons upon which the machine frame or structure is built, all of the said angle-irons being provided with laterally extending integrally formed base plates 2 whereby mounting or fastening of the machine is greatly facilitated. Spaced above the supporting structure, (upon which the machine is mounted) a predetermined distance, I provide a plurality of laterally extending angle-irons or braces 3, certain of which are adapted to support the base or floor 4 of the machine. Secured to the central brace 3 and extending parallel with the irons 1, are a pair of intermediate vertical angle-braces 5 extending throughout the entire length of the frame and projecting as at 6, above the top thereof. An intermediate laterally extending brace iron 7 connects the rear irons 1 about midway the length thereof, while braces 8 are provided, in alinement with the brace 7 upon each side of the frame. Two forward or front braces 9 and 10, corresponding in size and shape to the braces 8, are disposed, one brace 9 upon the inner face of the front iron 1, and slightly beneath the other brace 10 which is secured upon the upper face thereof for a purpose to be hereinafter fully described. The upper extremity of the frame is provided with brace irons 11, disposed (preferably) in a like manner to the lower irons 3 of the frame, the said irons 11 supporting the top 12 of the frame which is secured thereto in any suitable manner. Side plates or pieces 13 and rear plates 14 are detachably secured to the frame irons in any suitable manner to permit their removal, should occasion demand, for cleaning or repairing the interior of the machine.

The rear vertically extending angle-irons 1 project above the frame as at 15 and are connected to the intermediate vertically extending irons 5 through the medium of connecting bars 16, while the irons 5 are braced by means of bars 17, depending at an angle from the top thereof to the forward extremity of certain of the upper irons 11.

A shaft 18 (square in cross section throughout the greater portion of its length) is journaled within the upper extremity of the portion 15 of the iron 1, which shaft is provided with pulleys 19 and 20 loosely mounted thereon, for the purpose of imparting motion to other machines or mechanism (not shown) which may be secured upon the top of the frame or employed in connection with the machine embodying this invention. Another pulley 21 is keyed or otherwise secured upon one end of the shaft 18 and connected to a third or double pulley 22, mounted upon a stud shaft 23, through the medium of a belt or cord 24, by means of which motion is imparted to the said shaft 18. A motor of any type may be connected, if desired, to the double pulley by any suitable means, thereby imparting motion to the shaft 23. A gear wheel 25 is mounted upon one end of the stud shaft 23, the said gear meshing with a pinion 26 secured upon one end of the main shaft 27 of the machine.

Bearings 28 are detachably secured to the intermediate vertically extending irons 5 of the machine within which, the main shaft 27 is slidably journaled, thus permitting an entire removal of the said shaft, or should occasion demand allowing the same to be laterally slid within its bearing for disengaging the pinion 26 and the gear wheel 25, which disengagement would permit independent operation of the shaft 18 and its accessories without operating the slicing mechanism controlled by the rotation of the main shaft 27. With the exception of the shaft extremities, the said shaft is preferably polygonal or square in cross section, for the purpose of rotating a plurality of circular blades or cutting knives 29, loosely mounted thereupon and slidable thereon, the said knives being provided with collars 30 provided with openings 31 through which the said shaft extends.

A slide 32 having sides extending throughout its length, is pivotally mounted as at 33 to the forward angle-irons 1 of the machine for normally closing the upper front portion thereof. the said slide being held in such closed position through the medium of suitable latch mechanism 34. A hand lever 35 is pivotally secured as at 36 upon one side of the slide 32, the said lever being provided with a plurality of spaced apart notches 37 adapted to engage the upper cross iron 10 of the frame for holding or supporting the slide 32 upon an incline, or as is clearly shown by the dotted lines in Fig. 3 of the drawings. A door 38 hingedly connected as at 39 is provided within the cover of the machine, the same, when opened creating a mouth for the reception of the material to be operated upon. A second guide-way 40, also having sides extending throughout its entire length, is detachably secured as at 41 to the rear intermediate angle-iron 7, and extends upon an angle within the interior of the frame to the floor 4 thereof, the said slide-way 40 receiving the material operated upon after the same has left the guide-way 32 above mentioned. A tray 42 is hingedly connected as at 43 to one of the angle-irons 3, the said tray when closed by the latch 44 provided for that purpose, creating a door or closure for the lower front portion of the machine, and normally engaging the cross iron 9, which limits the inward movement of the said tray. The tray when opened as indicated by the dotted lines in the said Fig. 3 forms a receptacle for the material acted upon as the same flows or falls from the slide 40 of the machine.

The means employed for adjusting the blades 29 and for guiding the same during their rotary movement comprises a substantially U-shaped bracket 45 detachably secured in any suitable manner to cross bars 46 extending upon the interior of the machine from the rear vertically extending irons 1 to the intermediate irons 5. A slotted plate 47 is adjustably secured to the bracket 45 through the medium of a pair of transversely extending pins or bolts 48, the said adjustment being controlled by the manipulation of the nuts 49 provided for that purpose upon the said bolts 48. Lazy-tongs 50 are mounted upon the slotted plate 47 through the medium of pins 51 extending through the said slot, the operation of the tongs being controlled by the manipulation of a hand lever 52 pivotally secured as at 53 to the said tongs. One of the said tongs 50 is fixedly secured to the plate 47 by means of a link 54 permanently secured as at 55 to the said plate. By this construction it will be seen that the operation of the said lever 52 will cause the tongs to open and close as desired. The said tongs are preferably semi-circular in form and extend, as is shown in Fig. 6 of the drawings so as to partially surround the blades 29. The extremities of the tongs are provided with adjustable pins 56 provided with bifurcated ends 57 within which the periphery of the blades 29 normally rotate. By reason of the said bifurcations, the lateral movement of the blades 29 upon the shaft 27 is controlled by the movement of the tongs 50, the said pins 56 simultaneously moving the blades according to the movement imparted to the said pins. The said pins, by reason of their novel and peculiar construction will also serve as a cleaning device for the blades and will prevent adhering of the meat or other material thereto in operation.

Referring now to the modification shown in Fig. 8 the main shaft (not shown) is mounted between blocks 58, one of which is adjustably secured to the angle-iron 59 by means of a plate 60 held in proper place through the medium of screw bolts 61. This form of bearing will greatly facilitate the removal of the main shaft should occasion demand.

Passing on to the description and the modification shown in Fig. 11, the numeral 66 designates a revoluble shaft, square in cross section, the ends being journaled in the machine sides or frame as is clearly shown. A hand lever 67 is secured to the said shaft 66 for swinging the fingers 68 out of and into engagement with the circular blades of the machine, the said fingers being slidably mounted upon the said shaft 66 so as to permit adjustment as required, one finger upon each side and in engagement with the said circular blades. This arrangement of the fingers will permit a thorough cleaning of the blades during the operation of the machine, and will allow any number of blades to be employed and cleaned in the manner above set forth. By operating the lever 67, and removing a pin 69 for normally holding the said shaft against rotation, the shaft may be partially rotated for swinging the fingers out of engagement with the said blades, whereupon the cleaning mechanism disclosed as a preferred form may be employed.

When it is desired that meat or other material should be sliced very thin, and the lazy-tong mechanism is incapable of answering the purposes of bringing the circular knives closely together, the said lazy-tong mechanism is then raised out of service, by operating the nuts 49, and a plurality of U-shaped members or spacing brackets 62 are fitted upon the shaft between the knives 63, thereby spacing the same uniformly. When properly spaced, the knives 63 are held in position by the nut 64 threaded upon one end of the shaft 65, the adjusting of the said nut until it tightly engages a washer 65' causing the latter to tightly engage the end spacing bracket 62 for preventing lateral movement of the knives upon the said shaft. The size of the members 62 may be varied, thus reducing or increasing the distance between the knives or blades of the shaft and producing a machine capable of slicing the material to any degree of thickness or thinness desired.

After bringing the knives closely together as above described the bracket 62 is placed between the last knife on the shaft and the washer whereby the turning of the nut will force the latter until it tightly engages the said bracket causing both the knives and brackets to remain in rigid and immovable relation to the shaft 65.

In operation the meat or other material acted upon is first placed upon the slide-way 32, the said way having been inclined through the operation of the lever 35, and the door 38 having been raised or opened to permit the insertion of the said material. By reason of the incline surface of the said slide 32 the meat is forced into engagement with the knives 29, the rotation of the latter, which is downward on the food, not only cutting or slicing the meat but forcing the same down upon the oppositely inclined slide-way 40 where it is carried by reason of the inclined surface down to the tray 42 for subsequent removal.

It will be seen from the above taken in connection with the accompanying drawings that the operation or manipulation of the lever 52 will slide the blades 29 upon the main shaft of the machine as desired; that the operation of the nuts 49 will regulate the vertical movement of the tongs 50 with relation to the blades 29; and that the notches 37 provided within the hand lever 35 will permit an adjustment of the slide-way 32 in relation to the blades 29, as desired.

It will be understood that the above description and accompanying drawings comprehend only the general and preferred embodiment of my invention; that the power applied to the machine may be derived from any source whatsoever; and that various minor changes in the details of construction, proportion and arrangement of the parts may be made within the scope of the appended claims and without sacrificing any of the advantages of my invention.

Having thus fully described my invention, what I claim as new and desire to secure by Letters Patent, is:—

1. In a food slicing machine, a plurality of rotatable blades, means operable to rotate said blades, and blade cleaning means engageable with the periphery of each blade, said means being movable to adjust the blades relatively to each other, as and for the purpose set forth.

2. In a food slicing machine, a plurality of rotatable blades, means operable to rotate said blades, and means including a plurality of bifurcated pins arranged to straddle the periphery of the several blades to provide for a cleaning of the blades, said pins being adjustable simultaneously to move the said blades relatively to each other, as and for the purpose set forth.

3. In a slicing machine, a plurality of circular cutting blades, means operable to rotate said blades, blade cleaning means engageable with the periphery of the several blades, and lazy-tong mechanism actuatable to simultaneously move the cleaning means for the several blades and to adjust the several blades relatively to each other, as and for the purpose set forth.

4. In a slicing machine, a plurality of circular cutting blades, means operable to rotate said blades, a plurality of bifurcated pins arranged in pairs, the pins of the several pairs being disposed to straddle the respective blades at substantially diametrically opposite points, and means operable to simultaneously move the several pins to adjust the blades relatively to each other, as and for the purpose set forth.

5. In a slicing machine, the combination of a frame, a shaft, a plurality of uniformly spaced apart circular cutting blades mounted upon and rotatable with said shaft, a bracket mounted upon the interior of the frame adjacent the said blades, a plate member adjustably secured to the said bracket, lazy-tong mechanism mounted upon the said plate, and means including a plurality of bifurcated pins carried by the said mechanism adapted to engage the said blades for adjusting the same laterally upon the said shaft, as and for the purpose set forth.

6. In a slicing machine, the combination of a frame, a shaft, square in cross section, journaled within said frame, a plurality of circular cutting blades mounted upon and rotatable with said shaft, a substantially U-shaped bracket secured upon the interior of the said frame adjacent the said blades, a plate member spaced from the said bracket and adjustably secured thereto, the said plate having a slot formed therein, arcuate lazy-tong mechanism adjustably mounted upon the said plate, pins extending transversely through the said tongs and extending through the said slot, and a plurality of bifurcated pins carried by the extremities of the said tong mechanism adapted to engage the said blades for guiding the same and adjusting them laterally upon the said shaft, as and for the purpose set forth.

7. In a slicing machine, a plurality of rotatable blades, means operable to rotate said blades, cleaning means comprising a pair of bifurcated pins arranged to straddle each blade, the said pins being disposed to engage the several blades at substantially diametrically opposite points, and means including lazy-tong mechanism operable to simultaneously move the several pins to adjust the blades relatively to each other, as and for the purpose set forth.

8. In a slicing machine, the combination of a frame, a shaft, square in cross section, journaled within said frame, means for imparting motion to said shaft, a plurality of uniformly spaced apart circular cutting blades loosely mounted upon and rotatable with said shaft, a substantially U-shaped bracket secured upon the interior of the frame adjacent said blades, a slotted plate spaced from the said U-shaped bracket and adjustably secured thereto, lazy-tong mechanism adjustably mounted upon said plate and shaped to partially surround the said blades, a plurality of bifurcated pins carried by the said tong adapted to engage said blades, and means for adjusting the said tong throughout the length of the said slot for sliding the said blades laterally upon the said shaft, as and for the purpose set forth.

In testimony whereof I affix my signature in presence of two witnesses.

HANS P. HOLM.

Witnesses:
MAX DIEDRICH,
L. G. SMITH.